United States Patent
Nahidi et al.

(10) Patent No.: US 11,396,287 B2
(45) Date of Patent: Jul. 26, 2022

(54) ARCHITECTURE AND METHODOLOGY FOR REAL-TIME TARGET WHEEL SLIP IDENTIFICATION TO OPTIMALLY MANAGE WHEEL STABILITY AND VEHICLE LATERAL GRIP

(71) Applicant: GM GLOBAL TECHNOLOGY OPERATIONS LLC, Detroit, MI (US)

(72) Inventors: Seyedeh Asal Nahidi, North York (CA); SeyedAlireza Kasaiezadeh Mahabadi, Novi, MI (US); Naser Mehrabi, Richmond Hill (CA); Saurabh Kapoor, Markham (CA); James H. Holbrook, Fenton, MI (US); Hualin Tan, Novi, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 152 days.

(21) Appl. No.: 16/791,470

(22) Filed: Feb. 14, 2020

(65) Prior Publication Data
US 2021/0253089 A1   Aug. 19, 2021

(51) Int. Cl.
*B60W 10/12* (2012.01)
*B60W 30/045* (2012.01)
*B60W 30/04* (2006.01)
*B60W 10/119* (2012.01)

(52) U.S. Cl.
CPC ......... *B60W 30/045* (2013.01); *B60W 30/04* (2013.01); *B60W 10/119* (2013.01); *B60W 10/12* (2013.01); *B60W 2030/043* (2013.01)

(58) Field of Classification Search
CPC .... B60W 30/045; B60W 30/04; B60W 10/12; B60W 2030/043; B60W 10/119
See application file for complete search history.

(56) References Cited

U.S. PATENT DOCUMENTS

| | | | |
|---|---|---|---|
| 4,750,124 A | 6/1988 | Lin et al. | |
| 6,035,251 A | 3/2000 | Hac et al. | |
| 6,106,081 A * | 8/2000 | Isono | B60T 8/1755 303/9.69 |
| 6,282,479 B1 | 8/2001 | Ghoneim et al. | |
| 6,325,469 B1 | 12/2001 | Carson et al. | |
| 6,813,552 B2 | 11/2004 | Ghoneim et al. | |
| 6,819,998 B2 | 11/2004 | Lin et al. | |
| 6,842,685 B2 | 1/2005 | Belvo et al. | |
| 6,856,885 B2 | 2/2005 | Lin et al. | |
| 6,856,886 B1 | 2/2005 | Chen et al. | |
| 6,865,468 B2 | 3/2005 | Lin et al. | |
| 6,879,898 B2 | 4/2005 | Ghoneim et al. | |
| 6,968,261 B2 | 11/2005 | Ghoneim et al. | |
| 7,099,759 B2 | 8/2006 | Ghoneim | |
| 7,181,326 B2 | 2/2007 | Lin et al. | |
| 7,274,984 B2 | 9/2007 | Shin et al. | |

(Continued)

*Primary Examiner* — Stephen Holwerda
(74) *Attorney, Agent, or Firm* — Cantor Colburn LLP

(57) ABSTRACT

A vehicle, system and method of operating the vehicle. A sensor measures a dynamic parameter of the vehicle. A processor determines a lateral force on a first tire based on the dynamic parameter of the vehicle, determines a longitudinal force on the first tire that achieves a maximal grip of the first tire for the lateral force, and adjusts a first torque on the first tire in order to achieve the determined longitudinal force at the first tire.

15 Claims, 8 Drawing Sheets

(56) References Cited

U.S. PATENT DOCUMENTS

| | | | |
|---|---|---|---|
| 7,706,941 B2 | 4/2010 | Majersik et al. | |
| 7,917,270 B2 | 3/2011 | Katrak et al. | |
| 8,108,103 B2 | 1/2012 | Moshchuk et al. | |
| 8,684,115 B2 | 4/2014 | Bryant | |
| 2002/0109402 A1* | 8/2002 | Nakamura | B60T 8/17552 303/146 |
| 2004/0176899 A1* | 9/2004 | Hallowell | B60W 30/02 701/84 |
| 2005/0149243 A1 | 7/2005 | Ghoneim | |
| 2006/0064215 A1 | 3/2006 | Turski et al. | |
| 2010/0161194 A1* | 6/2010 | Turski | B60T 8/175 701/87 |
| 2010/0168977 A1* | 7/2010 | Matsuno | B60W 30/00 701/74 |
| 2010/0198445 A1 | 8/2010 | O'Dea et al. | |
| 2012/0029769 A1 | 2/2012 | Chen et al. | |
| 2012/0059547 A1 | 3/2012 | Chen et al. | |
| 2013/0006440 A1 | 1/2013 | Petrucci et al. | |
| 2015/0274159 A1* | 10/2015 | Lu | B60W 40/10 180/65.265 |
| 2017/0369050 A1* | 12/2017 | Varnhagen | B60W 30/045 |

\* cited by examiner

ARCHITECTURE AND METHODOLOGY FOR REAL-TIME TARGET WHEEL SLIP IDENTIFICATION TO OPTIMALLY MANAGE WHEEL STABILITY AND VEHICLE LATERAL GRIP

INTRODUCTION

The subject disclosure relates to controlling tire forces and, in particular, to a system and method for distributing forces between tires to obtain a maximal tire grip in a turn.

A vehicle's tire is able to grip the road when a transverse force on the tire or force parallel to the road, is less than a force known as a saturation force of the tire. However, when this transverse force exceeds the saturation force, the tire slips along the road, leading to vehicle instability. A vehicle exerts a lateral force on the tire as it makes a turn. Depending on the dynamics of the turn, the lateral force on one tire can be different from the lateral forces on another tire. Thus, it is possible for one tire to lose grip with the road while another tire maintains its grip. Such scenarios lead to wheel instability and difficulties controlling the vehicle. Accordingly, there is a desire to be able to control lateral forces on the tires of a vehicle in order to achieve a maximal grip of the tires against the road.

SUMMARY

In one exemplary embodiment, a method of operating a vehicle is disclosed. A lateral force is determined on a first tire of the vehicle from a dynamic parameter of the vehicle. A longitudinal force on the first tire is determined that achieves a maximal grip of the first tire for the lateral force. A first torque is adjusted on the first tire in order to achieve the determined longitudinal force at the first tire.

In addition to one or more of the features described herein, adjusting the first torque further includes additionally adjusting a second torque on a second tire. In one embodiment, the first tire is a saturated tire and the second tire is an unsaturated tire, and the first torque is adjusted to reduce the longitudinal force on the first tire by using a remaining capacity of the second tire. An ideal slip ratio is determined for the first tire from a normalized longitudinal force on the first tire and a relationship between the normalized longitudinal force and ideal slip. The longitudinal force on the first tire is determined from the ideal slip and real-time road conditions. In one embodiment, the torque is transferred between a front axle and a rear axle. The method includes adjusting an upper bound of the first torque applied to the first tire based on a saturation level of the first tire.

In another exemplary embodiment, a system for operating a vehicle is disclosed. The system includes a sensor for measuring a dynamic parameter of the vehicle, and a processor. The processor is configured to: determine a lateral force on a first tire based on the dynamic parameter of the vehicle, determine a longitudinal force on the first tire that achieves a maximal grip of the first tire for the lateral force, and adjust a first torque on the first tire in order to achieve the determined longitudinal force at the first tire.

In addition to one or more of the features described herein, the processor is further configured to adjust the first torque on the first tire by additionally adjusting a second torque on a second tire. In one embodiment, first tire is a saturated tire and the second tire is an unsaturated tire, and the processor is further configured to adjust the first torque to reduce the longitudinal force on the first tire by using a remaining capacity of the second tire. The processor is further configured to determine an ideal slip ratio for the first tire from a normalized longitudinal force on the first tire and a relationship between the normalized longitudinal force and ideal slip. The processor is further configured to determine the longitudinal force on the first tire from the ideal slip and real-time road conditions. The processor is further configured to transfer torque between a front axle and a rear axle. The processor is further configured to adjust an upper bound of torque applied to the first tire based on a saturation level of the first tire.

In yet another exemplary embodiment, a vehicle is disclosed. The vehicle includes a sensor for measuring a dynamic parameter of the vehicle, and a processor. The processor is configured to determine a lateral force on a first tire based on the dynamic parameter of the vehicle, determine a longitudinal force on the first tire that achieves a maximal grip of the first tire for the lateral force, and adjust a first torque on the first tire in order to achieve the determined longitudinal force at the first tire.

In addition to one or more of the features described herein, the processor is further configured to adjust the first torque on the first tire by additionally adjusting a second torque on a second tire. In one embodiment, the first tire is a saturated tire and the second tire is an unsaturated tire, and the processor is further configured to adjust the first torque to reduce the longitudinal force on the first tire by using a remaining capacity of the second tire. The processor is further configured to determine an ideal slip ratio for the first tire from a normalized longitudinal force on the first tire and a relationship between the normalized longitudinal force and ideal slip, and determine the longitudinal force on the first tire from the ideal slip and real-time road conditions. The processor is further configured to transfer torque between a front axle and a rear axle. The processor is further configured to adjust an upper bound of torque applied to the first tire based on a saturation level of the first tire.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
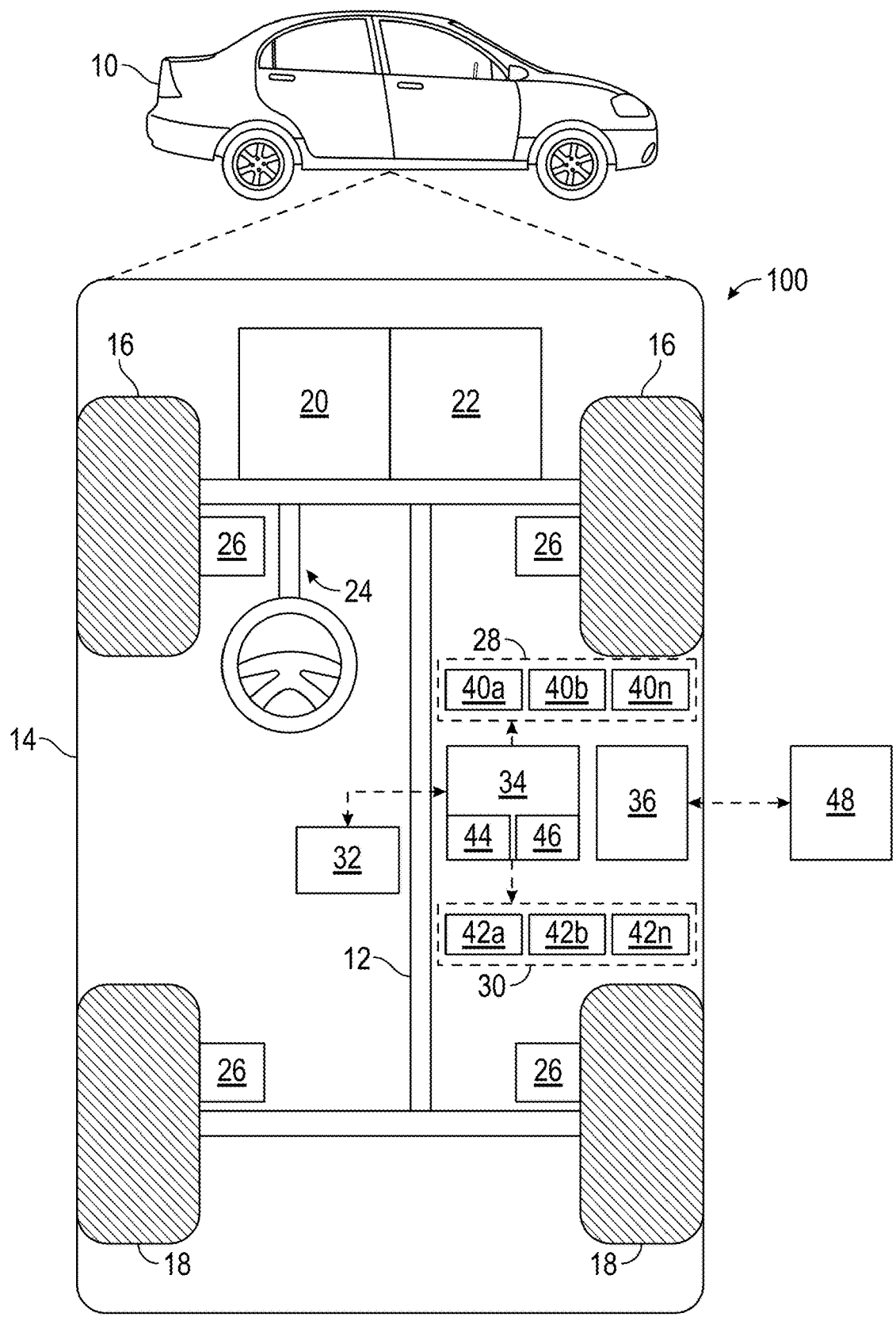
FIG. 1 shows a vehicle including an associated trajectory planning system in accordance with various embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows a vehicle 10 including an associated trajectory planning system shown generally at 100 in accordance with various embodiments. In general, the trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle and the trajectory planning system 100 is incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image. The sensor system 28 can also include sensors for measuring a kinematic parameter or dynamic parameter of the vehicle, such as a longitudinal velocity, lateral velocity, longitudinal acceleration, lateral acceleration, yaw angle, yaw rate, etc., or parameters that can be used to calculate these dynamic parameters.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, enable the processor 44 to receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the trajectory planning system 100 and, when executed by the processor 44, generates a trajectory output that addresses kinematic and dynamic constraints of the environment. In an example, the instructions received are input process sensor and map data. The instructions perform a graph-based approach with a customized cost function to handle different road scenarios in both urban and highway roads.

Figure 2:
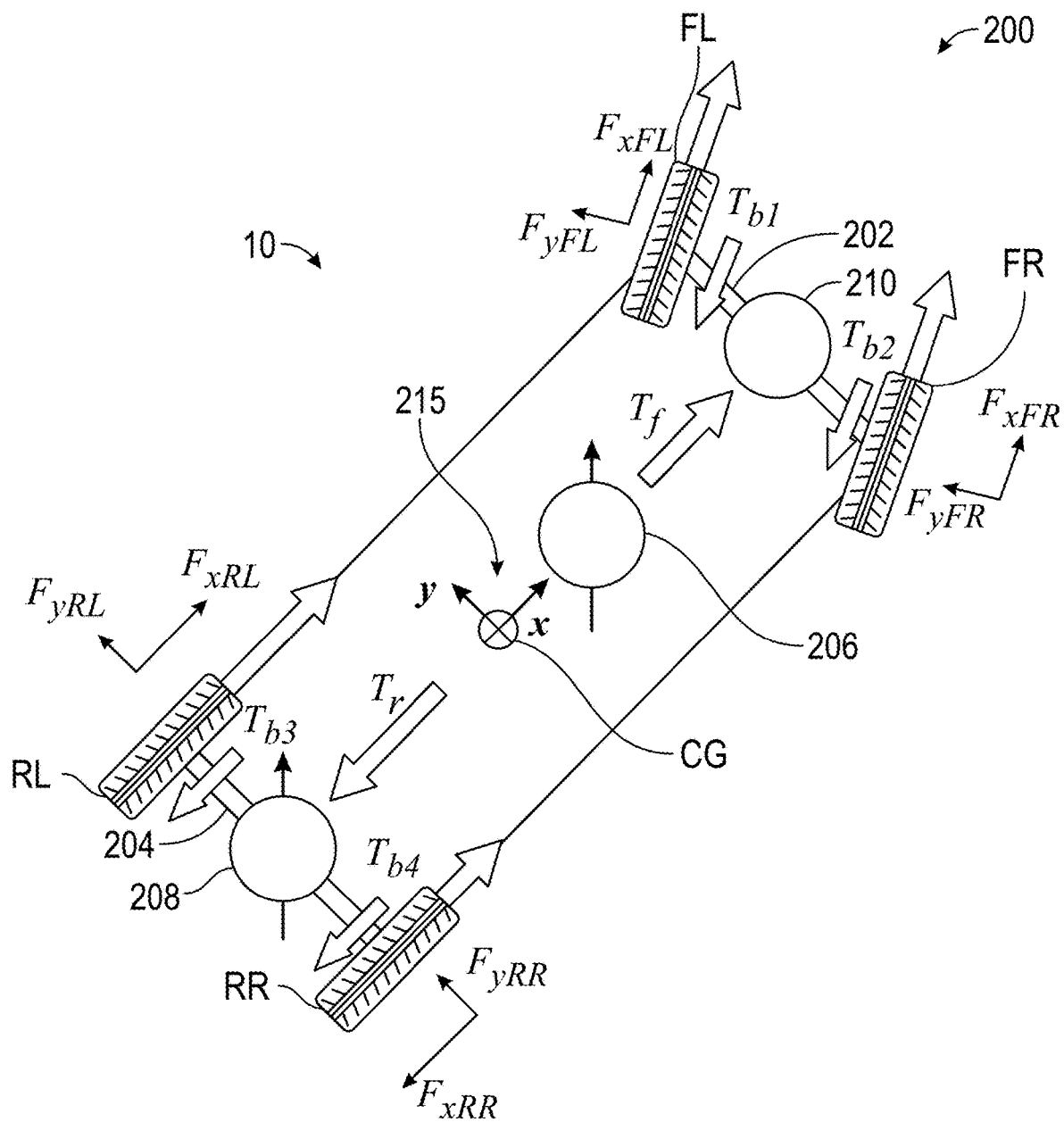
FIG. 2 shows a top view of an outline of the vehicle illustrating various actuators for distributing forces and torques to the tires of the vehicle.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The processor 44 further includes programs for operating the vehicle in at least one of two modes of operation; a standard mode of operation, and a performance mode of operation. In the standard mode of operation, the processor 44 operates a standard simulation model of the vehicle that provides a linear relation between driver's inputs and vehicle dynamics. The standard simulation model receives driver's inputs and determines a dynamic parameter of the vehicle based on the driver's inputs. The standard simulation model generates actuator commands for the actuators of the vehicle and the processor 44 sends these commands to the actuators in order to generate the dynamic parameter at the vehicle.

In the performance mode of operation, the processor 44 operates a performance simulation model of the vehicle 10. The performance simulation model is generally a non-linear model of the vehicle and generally takes in more input than the standard simulation model in order to determine a dynamic parameter for the vehicle. For example, the standard simulation model generally receives a driver's steering wheel angle as an input, while the performance simulation model generally receives a tractive torque on a tire and a braking torque on the tire in addition to the steering wheel angle in order to determine the dynamic parameter. Thus, the performance simulation model includes inputs from the accelerator pedal and brake pedal in addition to the steering wheel angle in order to define the dynamic states of the vehicle 10. The performance model further uses several actuators that are not used in the standard mode of operation, as shown in FIG. 2.

FIG. 2 shows a top view 200 of an outline of the vehicle 10 illustrating various actuators for the vehicle for distributing forces and torques to the tires of the vehicle. A center of gravity CG of the vehicle is shown and a vehicle-centered coordinate system 215 is shown at the center of gravity defining a longitudinal axis (x) and a lateral axis (y) for the vehicle 10. The vehicle 10 includes a front left tire (FL), front right tire (FR), rear left tire (RL) and rear right tire (RR). A front axle 202 supports the front left tire FL and front right tire FR, and a rear axle 204 supports the rear left tire RL and rear right tire RR. Tire forces ($F_{x,FL}$, $F_{y,FL}$), ($F_{x,FR}$, $F_{y,FR}$), ($F_{x,RL}$, $F_{y,RL}$) and ($F_{x,RR}$, $F_{y,RR}$) are shown for the front left tire (FL), front right tire (FR), rear left tire (RL) and rear right tire (RR), respectively. A system of drive mechanisms delivers a torque from the engine to the tires to cause rotation of the tires. The system of drive mechanisms includes, but is not limited to, an All-Wheel Drive actuator (eAWD) 206, an electronic limited-slip differential actuator (eLSD) 208 and an open differential (OD) 210. The electronic All-Wheel Drive actuator (eAWD) 206 controls a distribution of torque between the front axle 202 and rear axle 204. The eAWD 206 is shown distributing a torque $T_f$ to the front axle 202 and a torque $T_r$ to the rear axle 204. The electronic limited-slip differential actuator (eLSD) 208 at the rear axle 204 controls torque distribution between the rear left tire (RL) and the rear right ire (RR). The open differential (OD) 210 at the front axle 202 controls torque distribution between the front left tire (FL) and the front right tire (FR). As shown in FIG. 2, the front left tire (FL) receives torque $T_{b1}$, the front right tire (FR) receives torque $T_{b2}$, the rear left tire (RL) receives torque $T_{b3}$ and the rear right tire (RR) receives torque $T_{b4}$.

Figure 3:
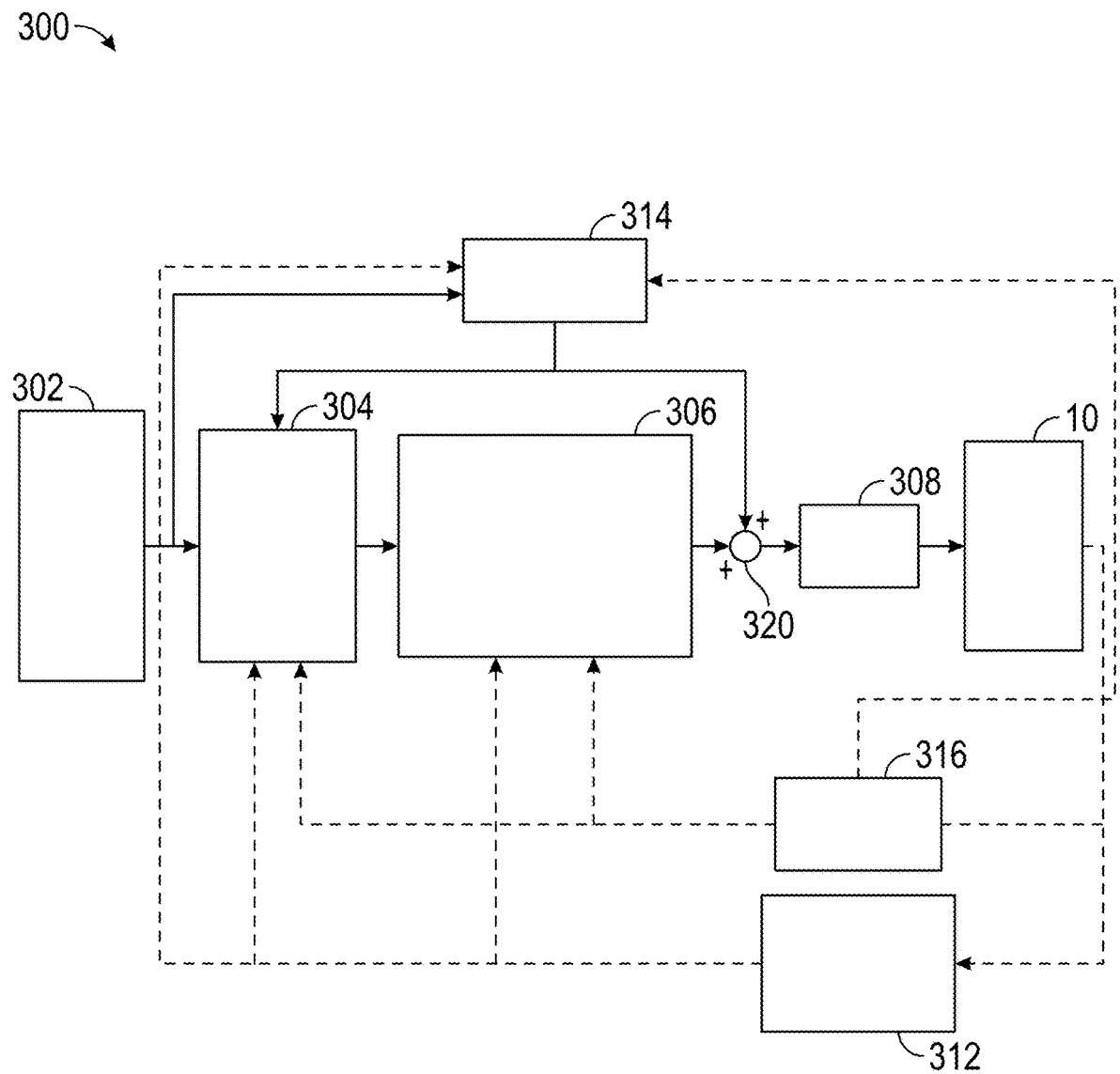
FIG. 3 shows a control system architecture for operating the vehicle in a driver-assisted or performance mode.

FIG. 3 shows a control system architecture 300 for operating the vehicle 10 in a driver-assisted or performance mode. In various aspects, the control system architecture 300 includes various modules that operate on the processor 44 in order to translate a driver's intentions into actual motion of the vehicle. The control system architecture 300 includes a target state determination module 304, a vehicle control module 306, and actuators 308. The target state determination module 304 determines a desired state of the vehicle based on the driver's inputs. The vehicle control module 306 determines a command control adjustment based on the desired state and operates actuators 308 in order to control the vehicle 10.

The control system architecture 300 receives the driver's inputs 302, such as a steering wheel angle, a brake pedal position and an accelerator pedal position, from the driver. The driver's inputs 302 are provided to the target state determination module 304. The target state determination module 304 computes a desired state ($S_d$) based on the driver's inputs and provides the desired state $S_d$ to the vehicle control module 306. The desired state $S_d$ can include, but is not limited to, a desired yaw rate, desired side slip angle, desired lateral velocity, and/or desired longitudinal velocity of the vehicle 10. The driver's inputs are also provided to a feedforward control module 314.

The vehicle control module 306 generates an actuator adjustment command ($\delta Q$) for the vehicle based on the desired state $S_d$. The actuator adjustment command $\delta Q$ can be added to an actuator command (Q) that corresponds to the driver's inputs at summer 320. The actuator command Q is provided from the feedforward control module 314. The summation (Q+$\delta Q$) is provided to the actuators 308 in order to provide an action $Q_a$ that operates the vehicle 10. The actuators can include, for example, the eAWD 206, the eLSD 208, and open differential 210. The actuators are used to generate the desired states (e.g., desired yaw rate, desired longitudinal velocity, etc.) at the vehicle 10. In various embodiments, the actuator commands can be adjusted to ensure that they do not cause tire forces to exceed a capacity of the tire.

The vehicle 10 thus undergoes the desired dynamic state, such as the desired yaw rate and/or the desired side slip angle. Sensors 316 on the vehicle 10 can detect these dynamic parameters and their values. Alternatively, sensors 316 can obtain measurements that can be used to determine these dynamic parameters. In addition, a vehicle state estimate and fault detection module 312 can estimate the values of these dynamic parameters. The sensed values of these dynamic parameters and the estimated values of these dynamic parameters can be provided to the vehicle control module 306 in order to help the vehicle control module 306 determine the command actuator adjustment δQ for a next time step of the vehicle control. These sensed and estimated values can also be provided to the target state determination module 304 in order to control calculation of the desired state $S_d$. Such feedback prevents the desired state $S_d$ generated by the target state determination module 304 from changing too rapidly. Sensors 316 can further provide the sensed values and estimated values to the feedforward control module 314.

As the vehicle turns, lateral forces are exerted on each of the tires. When the lateral force on a tire exceeds a certain saturation value of the tire, the tire loses grip with the road and slips laterally. The method disclosed herein determines the lateral force on at least one tire and adjusts torques applied to the tire in order to obtain a maximal grip for the tire given the lateral force. In various embodiments, the method determines a lateral force on a first tire and a lateral force on a second tire and adjusts torques between the first tire and the second tire in order to obtain a maximal grip for the first and second tires. In various embodiments, adjusting the torque transfers a longitudinal force on each of the first and second tires in order to maximize grip for each tire. For instance, when a lateral force on the first tire leads to tire slippage and the second tire has unused capacity, the torques can be adjusted to transfer forces from the first tire to the second tire to reduce slippage on the first tire by employing the unused capacity of the second tire. The balancing of forces between the first tire and the second tire can be between front tires and back tires, left tires and right tires, or any combination therefore.

Figure 4:
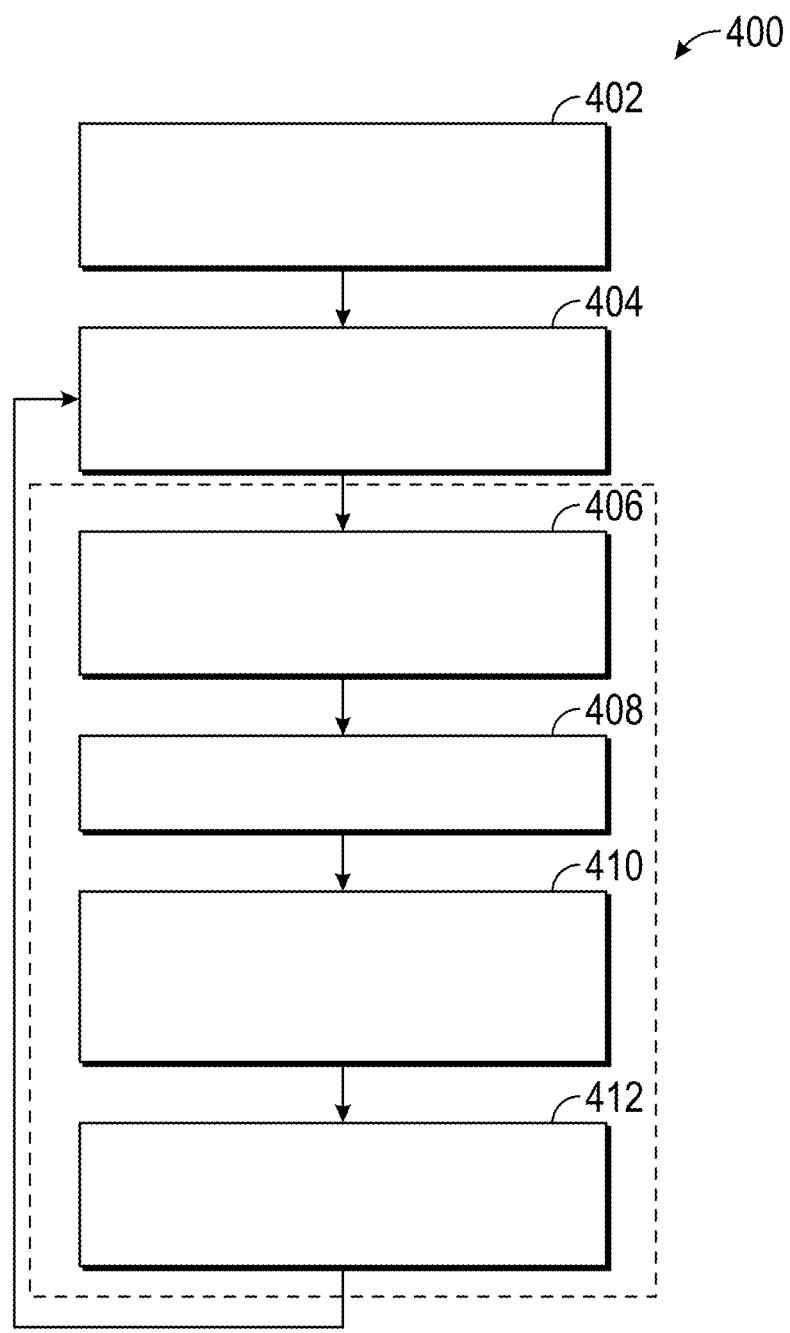
FIG. 4 shows a flowchart illustrating a method of achieving a maximal grip for a tire experiencing a lateral force in a turn.

FIG. 4 shows a flowchart 400 illustrating a method of achieving a maximal grip for a tire experiencing a lateral force in a turn.

In box 402, sensor measurements relevant to tire and vehicle dynamics are obtained at the vehicle. These sensor measurements can include, but are not limited to, applied torques, steering angle, rotation rates of tires, a yaw rate of the vehicle, accelerometer measurements, etc. In box 404, the sensor measurements are input into an integrated tire and vehicle model of the vehicle in order to determine at least a lateral force on at least one tire. In box 406, "optimal" lateral and longitudinal forces on a wheel are calculated. These optimal forces are those which saturate the tire, thereby achieving a maximal grip of the tire to the road. In box 408, an ideal target slip is calculated corresponding to the optimal lateral and longitudinal forces on a tire calculated in box 406. The ideal target slip corresponds to "optimal" or dry road conditions. In box 410, a real time target slip modification is determined based on the ideal target slip of box 408 and current road conditions, which may include a wet road conditions or icy road conditions, for example. In box 412, a wheel slip control strategy is performed at the various actuators of the vehicle in order to distribute torques and forces amongst the tires in a manner that achieves an optimal control of the vehicle for the current tire and road conditions. Once the torques and forces have been distributed on the vehicle, the method returns to box 404 in order to determine a current or updated value of the lateral force for a subsequent time step. Details of the method disclosed in FIG. 4 are discussed below.

Figure 5:
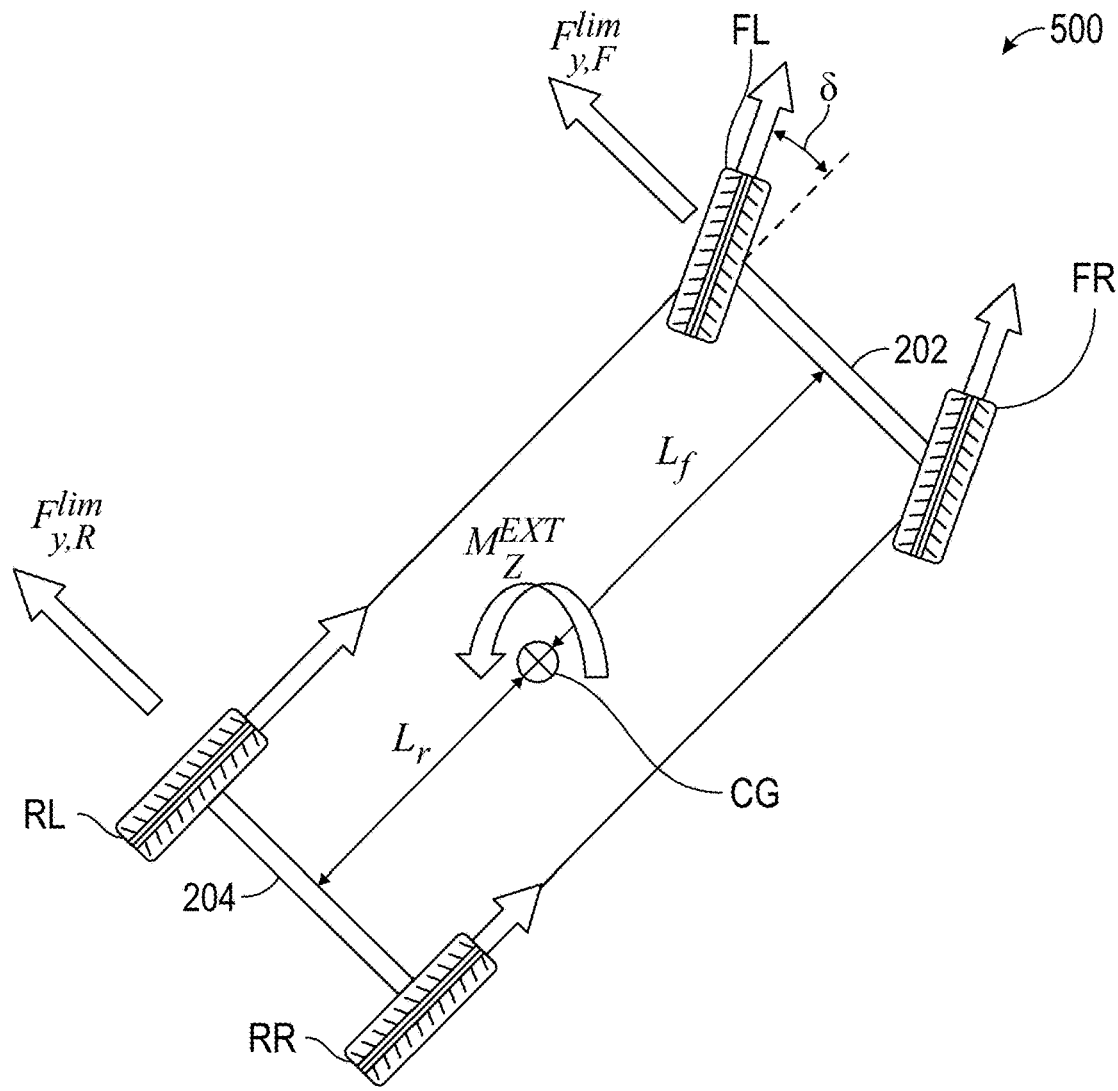
FIG. 5 shows a vehicle in an illustrative turn depicting various forces and torques on the vehicle in the turn.

FIG. 5 shows a vehicle in an illustrative turn 500, depicting various forces and torques on the vehicle in the turn. Force vector $F_{y,F}^{lim}$ indicates a lateral force on the front axle and force vector $F_{y,R}^{lim}$ indicates a lateral force on the rear axle. These forces apply a torque on the vehicle about its center of gravity, which can be balanced by an externally applied torque, such as tire friction. A torque balance equation describing conditions in which there is no rotation or constant rotation of the vehicle given the forces shown in FIG. 5 is shown in Eq. (1):

$$\left(\frac{F_{y,F}^{lim}}{L_R} - \frac{F_{y,R}^{lim}}{L_F}\right) + \left(\frac{M_Z^{EXT}}{L_F L_R}\right) = 0 \qquad \text{Eq. (1)}$$

where $F_{y,F}^{lim}$ is a lateral force at the front axle, $F_{y,R}^{lim}$ is a lateral force at the rear axle, LF is a distance from the center of gravity to the front axle 202 and $L_R$ is a distance from the center of gravity CG to the rear axle 204. The term $M_z^{EXT}$ is an externally applied yaw moment on the vehicle.

In addition to the torque balancing equation of Eq. (1), a force balancing equation for the vehicle in the turn is shown in Eq. (2):

$$F_{y,F}^{lim} \cos \delta + F_{y,R}^{lim} - m a_y^{des} = 0 \qquad \text{Eq. (2)}$$

where δ is a steering angle of the front axle, m is a mass of the vehicle and $a_y^{des}$ is a desired lateral acceleration of the vehicle. Eqs. (1) and (2) can be solved to determine the lateral force at the front axle and the lateral force at the rear axle. The optimal lateral forces, i.e., forces at which a tire achieves maximal grip, are set to these lateral force values by Eqs. (3) and (4):

$$F_{y,F}^{opt} = F_{y,F}^{lim} \qquad \text{Eq. (3)}$$

where $F_{y,F}^{opt}$ is the optimal lateral force on the front tires, and $$F_{y,R}^{opt} = F_{y,R}^{lim} \qquad \text{Eq. (4)}$$

where $F_{y,R}^{opt}$ is the optimal lateral force on the rear axle.

Figure 6:
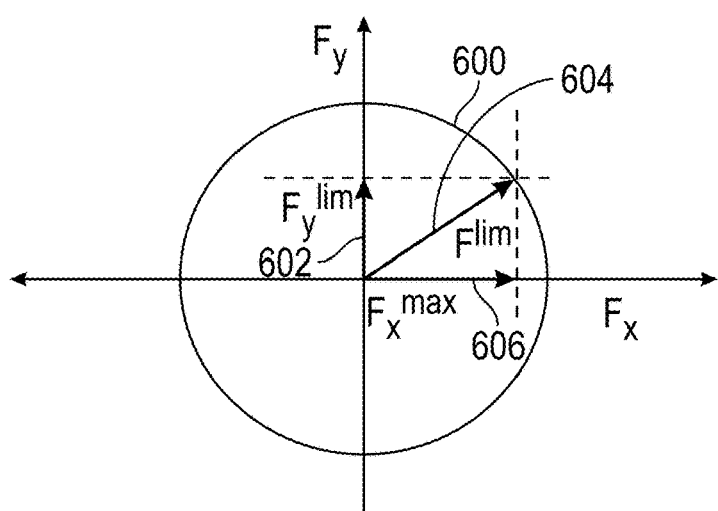
FIG. 6 shows a traction circle for a tire.

FIG. 6 shows a traction circle 600 for a tire. The traction circle 600 indicates a limit for lateral and longitudinal tire forces for maintaining a grip on the road. Longitudinal forces are shown along the x-axis while lateral forces are shown along the y-axis. Forces on the tire are represented by force vectors centered at the origin. When a force vector lies within the traction circle, the tire is able to maintain its grip on the road. When the force vector exceeds the traction circle or lies outside of the traction circle, the tire loses its grip with the road and slides along the road. When the force on the tire is on the traction circle 600, the tire is said to be saturated. Although represented as a circle in FIG. 6, a traction circle 600 for any particular tire can have other shapes, including an elliptical shape, etc. Additionally, the size of the traction circle 600 is based on various parameters, including a normal force being applied to the tire.

Lateral force vector 602 indicates the lateral force $F_y^{lim}$ on the tire in a turn. Lateral force vector 602 is a lateral component of a limiting force vector 604 that lies along the traction circle 600, such limiting force vector 604 providing a maximal grip for the tire. The limiting force vector 604 also includes longitudinal force vector 606 ($F_x^{max}$) which is a maximal possible longitudinal force on the tire that still allows the tire to grip the road. The longitudinal force vector 606 can be determined from the lateral force vector 602 using Eq. (5):

$$F_{x,ij}^{max} = \mu_{x,ij}\sqrt{F_{z,ij}^2 - (F_{y,ij}^{lim}/\mu_{y,ij})^2} \qquad \text{Eq. (5)}$$

where $F_{x,ij}^{max}$ is a maximum longitudinal force that can be applied to tire, given lateral force $F_{y,ij}^{lim}$, while gripping the road. $F_{z,ij}$ is a normal force applied to the tire. The indices i and j are used to represent wheel location i={front, rear} and j={left, right}, Eq. (5) further includes various road surface coefficients, where $\mu_{x,ij}$ is a normalized longitudinal force and $\mu_{y,ij}$ is a normalized lateral force for the tire.

The tire forces are then combined in order to determine the maximum longitudinal forces on related axles. The maximum longitudinal force that can be handled be at the front axle 202 is a summation of the maximum longitudinal forces on each of the front wheels, as indicated in Eq. (6):

$$F_{x,F}^{max} = F_{x,FL}^{max} + F_{x,FR}^{max} \qquad \text{Eq. (6)}$$

Similarly, the maximum longitudinal force that can be handled be at the rear axle 204 is a summation of the maximum longitudinal forces on each of the rear vehicles, as indicated in Eq. (7):

$$F_{x,R}^{max} = F_{x,RL}^{max} + F_{x,RR}^{max} \qquad \text{Eq. (7)}$$

For the same reasons presented with respect to Eqs. (3) and (4), the optimal longitudinal force at the front axle is set by Eq. (8):

$$F_{x,F}^{opt} = F_{x,F}^{max} \qquad \text{Eq. (8)}$$

and the optimal longitudinal force at the rear axle is set by Eq. (9):

$$F_{x,R}^{opt} = F_{x,R}^{max} \qquad \text{Eq. (9)}$$

Once the optimal forces have been calculated for each axle, the optimal forces can be calculated for each tire. In an optimal distribution of forces along each axle, the right and left tires share the forces on the axle equally. Therefore, $$F_{x,ij}^{opt} = F_{x,i}^{opt}/2 \qquad \text{Eq. (10)}$$

where i={front, rear} and j={left, right}. For a selected tire, the optimal longitudinal force can be normalized with respect to the normal force on the tire, as shown in Eq. (11):

$$F_{x,ij}^{opt}/F_{z,ij} = \mu_{z,ij} \qquad \text{Eq. (11)}$$

where $\mu_{x,ij}$ is the normalized longitudinal force. Eq. (11) assumes ideal conditions. However, in non-ideal conditions, such as in slippery road conditions, $$F_{x,ij}^{opt}/\mu_s F_{z,ij} = u_{z,ij} \qquad \text{Eq. (12)}$$

where $\mu_s$ is a surface adhesion coefficient. If $\mu_s<1$, the normalized longitudinal force estimated using Eq. (11) is larger than the limiting value determined from the traction circle, which can result in an inaccurate calculation of forces. In order to determine forces for the current road conditions, the normalized force is determined assuming $\mu_s=1$ (i.e., using Eq. (11)). These normalized forces are then used to determine slip or slip ratio.

Figure 7:
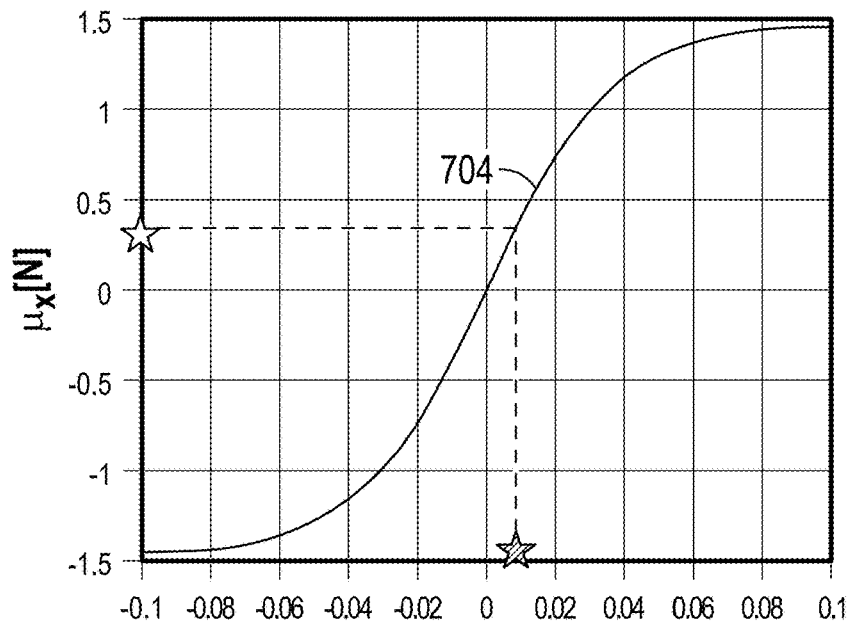
FIG. 7 shows graphs of normalized longitudinal force to slip ratio for front and rear tires of a vehicle.
Figure 7:
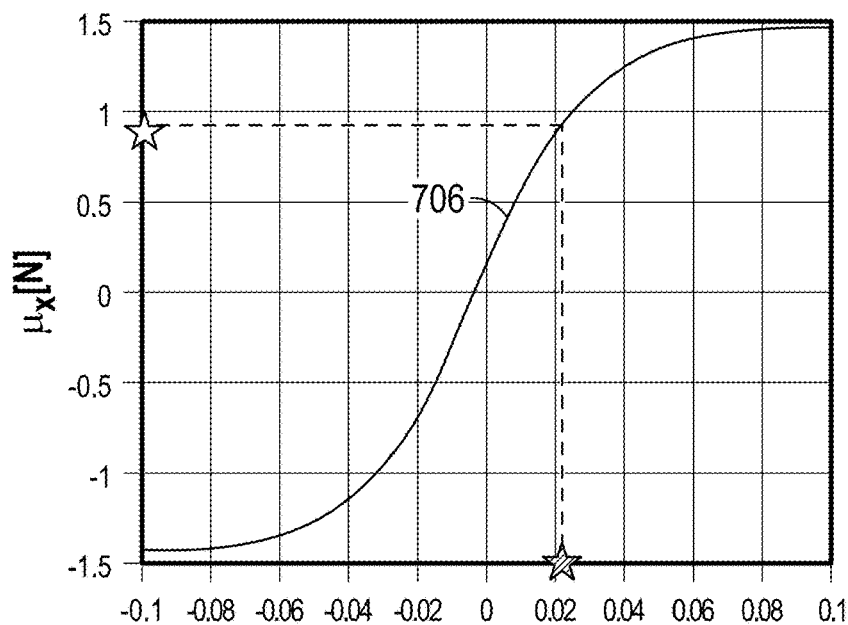

FIG. 7 shows graphs of normalized longitudinal force to slip ratio for front and rear tires of a vehicle. Graph 700 is a graph of normalized longitudinal force vs. slip ratio of a front tire of the vehicle. Graph 702 is a graph of normalized longitudinal force vs. slip ratio of a rear tire of the vehicle. Curve 704 shows the relation between normalized longitudinal force and slip ratio for the front tires, while curve 706 shows the relation between normalized longitudinal force and slip ratio for the rear tires. The curves 704 and 706 assume optimal road conditions. Using their respective curves, the normalized longitudinal force determined from Eq. (11) for a tire is used to determine a slip ratio for the front and rear tires. For example, for the front tires, the normalized longitudinal force is about 0.3 and corresponds to an ideal slip of 0.01. For the rear tires, the normalized longitudinal force is about 0.9 and corresponds to an ideal slip of about 0.02. Once the ideal slip is determined for a tire, longitudinal forces can be determined that achieve this ideal slip at the tire for current road conditions.

Figure 8:
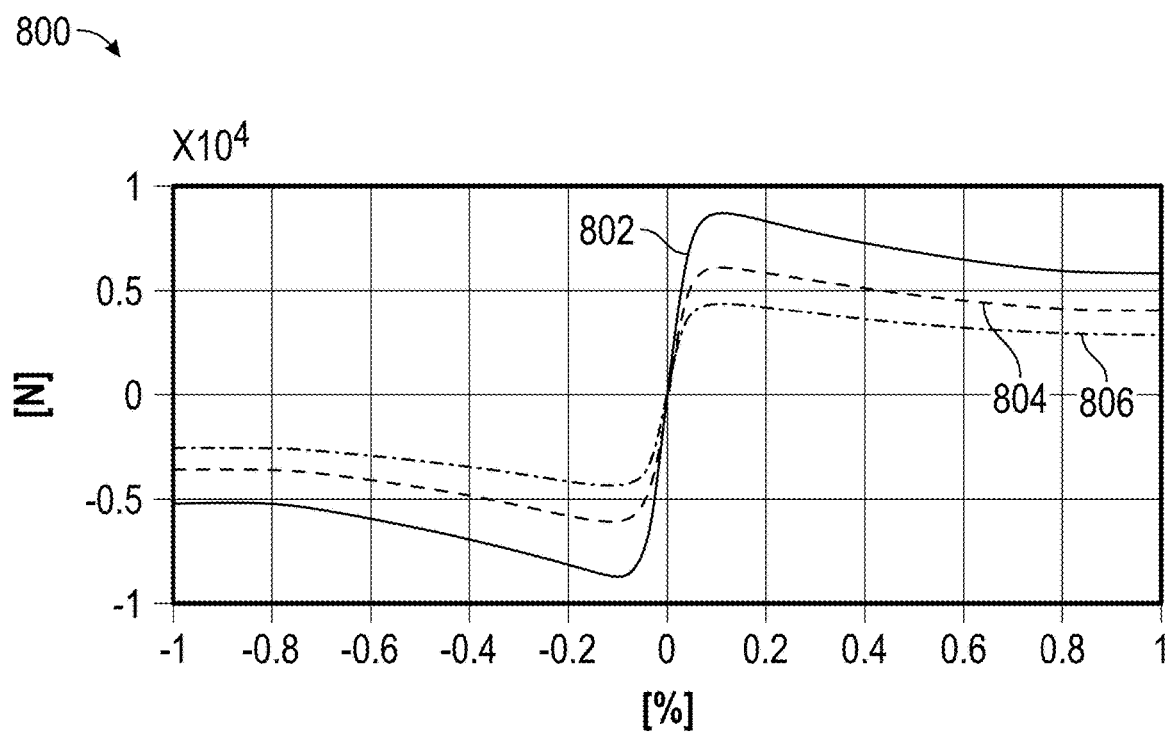
FIG. 8 shows a graph of relations between longitudinal force and slip ratio for a plurality of steering angles of a tire.

FIG. 8 shows a graph 800 of relations between longitudinal force and slip ratio for a plurality of steering angles of a tire. Curve 802 represents a relation for a steering angle of 0 degrees, curve 804 represents a relation for a steering angle of 5 degrees, and curve 806 represents a relation for a steering angle of 10 degrees. A longitudinal force for a tire can be determined using the relevant curve and the ideal slip ratio determined using the graphs of FIG. 7.

Figure 9:
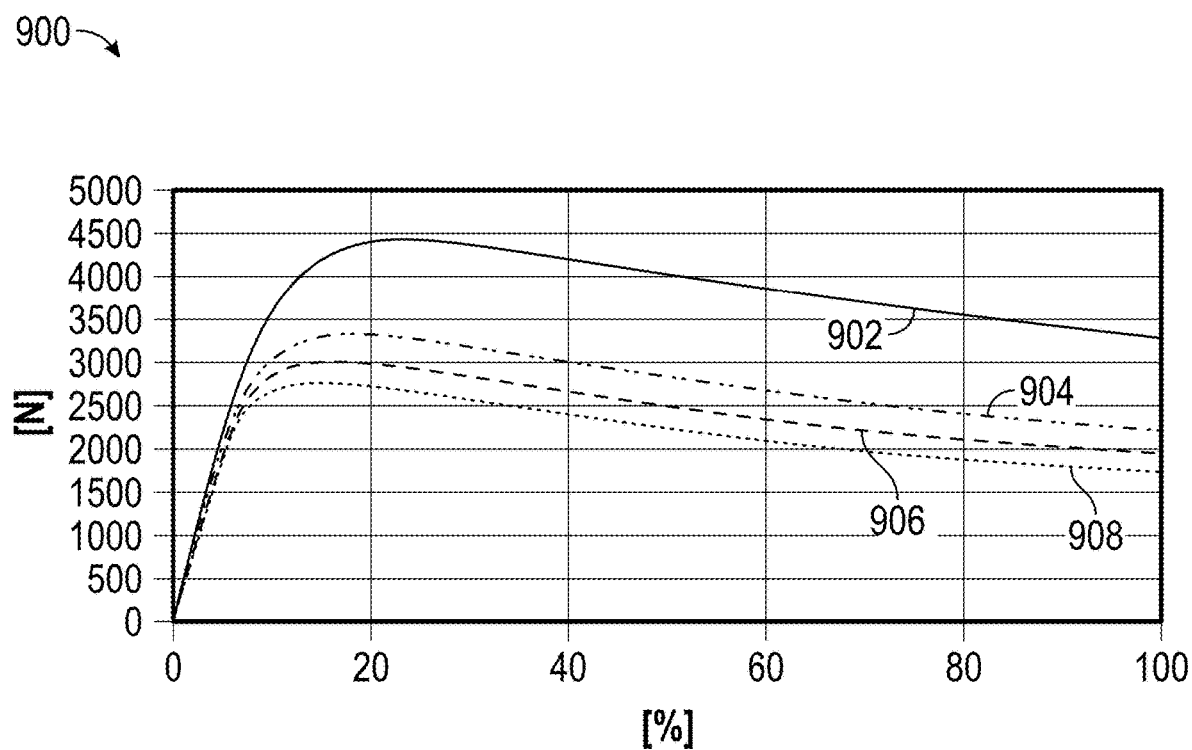
FIG. 9 shows a graph of relations between longitudinal force and slip ratio for a plurality of road conditions.

FIG. 9 shows a graph 900 of relations between longitudinal force and slip ratio for a plurality of road conditions. Curve 902 represents a relation for concrete, curve 904 represents a relation for dry asphalt, curve 906 represents a relation for wet asphalt, and curve 908 represents a relation for ice. A longitudinal force for a tire can be determined using the relevant curve and the ideal slip ratio determined using the graphs of FIG. 7.

Once the longitudinal forces to be applied have been determined based on ideal and real-time road conditions, torque is adjusted on the tire to achieve this longitudinal force. In various embodiments, torque can be adjusted between tires in order to transfer longitudinal forces from one tire to another tire. The amount of force transferred depends on a remaining tire capacity of the tire receiving the force.

In various embodiments, the control system architecture 300 controls a torque transfer between tires in order to maximize a grip of the tires to the road. Controlling the torque includes transferring torque between front and rear axles, using the eAWD 206, as well as transferring torque between right rear and left rear wheels, using the eLSD 208. The torque transfer operation includes modifying upper bounds which control a speed at which the torque can be adjusted.

For the torque transfer operation between front axle and rear axle and upper bound $\Delta T^{max}$ is defined. The upper bound pertains to the axle receiving the torque, also referred to herein as the receiver axle. The upper bound is a function, in part, of a capacity of the receiver axle. In particular, when the front axle is the receiver axle, the upper bound is defined as shown in Eq. (13):

$$\Delta T_f^{max} = \min(T_m^{cap}, T_{axle,f}^{max}) \qquad \text{Eq. (13)}$$

here $\Delta T_f^{max}$ is the upper bound for torque transfer to the front axle, $T_m^{cap}$ is a maximum torque capacity of a motor of the front axle and $T_{axle,f}^{max}$ is the torque capacity of the front axle. When the rear axle is the receiver axle, upper bound is defined by Eq. (14):

$$T_r^{max} = \min(T_e^{cap}, T_{axle,r}^{max}) \qquad \text{Eq. (14)}$$

where $\Delta T_r^{max}$ is the upper bound for torque transfer to the rear axle, $T_e^{cap}$ is a maximum capacity of a motor of the rear axle and $T_{axel,r}^{max}$ is the torque capacity of the rear axle.

The torque is transferred between axles over a series of time steps. With each time step, the upper bound is redetermined based on updated conditions. Under a condition in which road conditions are overestimated (i.e., the quality of the road is less than ideal), the torque may need to be reduced on an axle. The torque is ramped down between time steps by a selected amount. The torque upper bound is reduced as indicated by Eq. (15):

$$\Delta T_i^{max}(k+1) = \Delta T_i^{max}(k) - \Delta T_{redc,i} \qquad \text{Eq. (15)}$$

where k is an index indicating a time step and $\Delta T_{redc,i}$ represents the selected torque reduction value. This ramping down process continues until the torque upper bound vanishes, at which point a ramp-up process can then be performed in order to raise the torque on the tire to reach a saturated condition. The torque upper bound is increase during the ramping-up process is described in Eq. (16):

$$\Delta T_i^{max}(k+1) = \Delta T_i^{max}(k) + \Delta T_{prom,i} \qquad \text{Eq. (16)}$$

where $\Delta T_{prom,i}$ represents a selected torque increase value.

Similarly, the torque transfer between rear right and rear left tires is controlled by an upper bound on the torque transferred between them. One tire will have more traction than the other based on the direction of the turn. This wheel is referred to herein as the high traction tire. The high traction wheel is detected using measured wheel speeds. The torque is adjusted between tires based on which tire is the high traction wheel. An upper bound of torque transfer is determined based on the high traction tire, as indicated in Eq. (17):

$$\Delta T_f^{max} = \begin{cases} \min(T_c^{cap}, T_{tire,RR}^{max}) & \omega_{RL} > \omega_{RR} \\ \min(T_c^{cap}, T_{tire,RL}^{max}) & \omega_{RL} < \omega_{RR} \\ 0 & \omega_{RL} = \omega_{RR} \end{cases} \qquad \text{Eq. (17)}$$

where $\omega_{RL}$ is an angular velocity of the rear left tire, $\omega_{RR}$ is an angular velocity of the rear right tire, $T_{tire,RR}^{max}$ is the torque capacity of the rear right tire and $T_{tire,RL}^{max}$ of the rear left tire. Unless a slip ratio of the high traction tire is greater than a selected threshold value, the torque is transferred to the high traction tire. As the torque is transferred, the torque upper bound is ramped down according to Eq. (18):

$$\Delta_c^{max}(k+1) = \Delta T_c^{max}(k) - \Delta T_{redc} \qquad \text{Eq. (18)}$$

where $\Delta_{red,c}$ is a torque reduction value. The ramping down process is continued until a longitudinal stability condition for the high traction wheel holds, indicating that the high traction wheel is in a stable condition. A ramp-up process is then started to smoothly increase the torque upper bound according to Eq. (19):

$$\Delta T_c^{max}(k+1) = \Delta_c^{max}(k) + T_{prom} \qquad \text{Eq. (19)}$$

Figure 10:
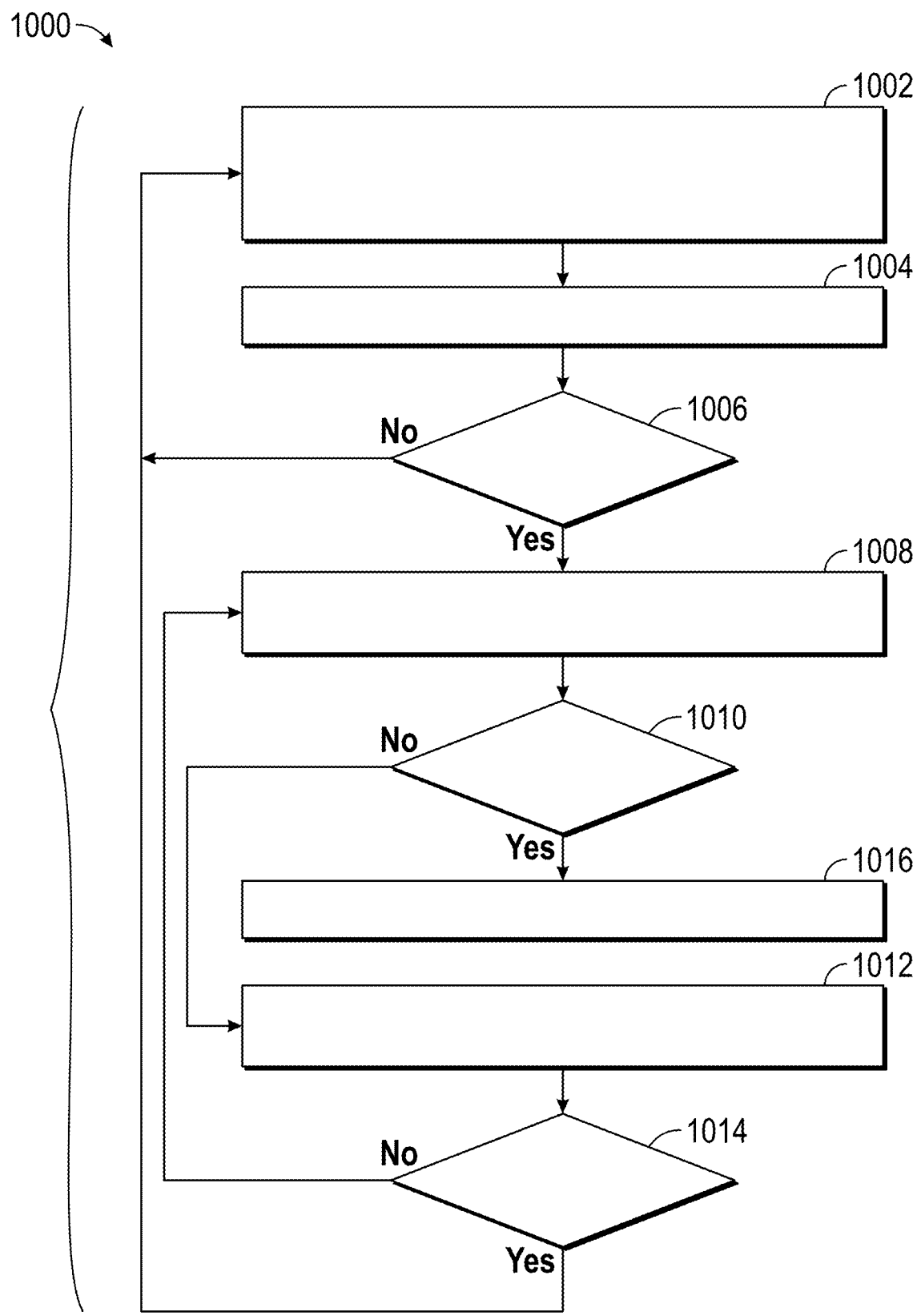
FIG. 10 shows a flowchart of a process for adjusting torque.

FIG. 10 shows a flowchart of a process 1000 for adjusting torque. In box 1002, a control action is calculated based on dry road conditions. The control action can be calculated using Eq. (19) below:

$$\Delta T_{ij}^{max} = R_{eff}(F_{x,ij}^{max} - F_{x,ij}^{curr})$$

where $R_{eff}$ is a scaling factor $F_{x,ij}^{max}$ is the maximum possible longitudinal force for maintaining a tire grip and $F_{x,ij}^{curr}$ is a current longitudinal force on the tire.

In box 1004, the longitudinal or lateral saturation is monitored. In box 1006, a determination is made of whether the tire is saturated or not. In box 1006, if the tire is not saturated, the process returns to box 1002 in order to continue the monitoring loop. However, if the tire is saturated, the method process to box 1008. In box 1008, the upper bound for torque transfer is reduced.

In box 1010, another determination is made of whether the tire is saturated or not. If the tire is saturated, the method proceeds to box 1016 in which the upper bound is set to zero. Returning to box 1010, if the tire is not saturated, the method proceeds to box 1012. In box 1012, the upper bound is increased. In box 1014, another determination is made of whether the tire is saturated or not. If the tire is not saturated, the method returns to box 1008 where the upper bound is ramped down. If the tire is saturated, the method returns to box 1002.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:
   determining, at a processor, a lateral force on a first tire of the vehicle from a dynamic parameter of the vehicle;
   determining, at the processor, a normalized longitudinal force on the first tire that achieves a maximal grip of the first tire for the lateral force;
   determining, at the processor, an ideal slip ratio for the first tire from the normalized longitudinal force on the first tire and a relationship between the normalized longitudinal force and the ideal slip ratio;
   determining, at the processor, a longitudinal force on the first tire from the ideal slip ratio and a relationship between the longitudinal force and the ideal slip ratio under real-time road conditions; and
   adjusting, via a transmission, a first torque on the first tire in order to achieve the determined longitudinal force at the first tire.

2. The method of claim 1, wherein adjusting the first torque further comprises additionally adjusting a second torque on a second tire.

3. The method of claim 2, wherein the first tire is a saturated tire and the second tire is an unsaturated tire, the method further comprising adjusting the first torque to reduce the longitudinal force on the first tire by using a remaining capacity of the second tire.

4. The method of claim 1, further comprising transferring torque between a front axle and a rear axle.

5. The method of claim 1, further comprising adjusting an upper bound of the first torque applied to the first tire based on a saturation level of the first tire.

6. A system for operating a vehicle, comprising:
   a sensor for measuring a dynamic parameter of the vehicle; and
   a processor configured to:
      determine a lateral force on a first tire based on the dynamic parameter of the vehicle;
      determine a normalized longitudinal force on the first tire that achieves a maximal grip of the first tire for the lateral force;
      determine an ideal slip ratio for the first tire from the normalized longitudinal force on the first tire and a relationship between the normalized longitudinal force and the ideal slip ratio;
      determine a longitudinal force on the first tire from the ideal slip ratio and a relationship between the longitudinal force and the ideal slip ratio under real-time road conditions; and
      adjust a first torque on the first tire in order to achieve the determined longitudinal force at the first tire.

7. The system of claim 6, wherein the processor is further configured to adjust the first torque on the first tire by additionally adjusting a second torque on a second tire.

8. The system of claim 7, wherein the first tire is a saturated tire and the second tire is an unsaturated tire, and the processor is further configured to adjust the first torque to reduce the longitudinal force on the first tire by using a remaining capacity of the second tire.

9. The system of claim 6, wherein the processor is further configured to transfer torque between a front axle and a rear axle.

10. The system of claim 6, wherein the processor is further configured to adjust an upper bound of torque applied to the first tire based on a saturation level of the first tire.

11. A vehicle, comprising:
a sensor for measuring a dynamic parameter of the vehicle; and
a processor configured to:
determine a lateral force on a first tire based on the dynamic parameter of the vehicle;
determine a normalized longitudinal force on the first tire that achieves a maximal grip of the first tire for the lateral force;
determine an ideal slip ratio for the first tire from the normalized longitudinal force on the first tire and a relationship between the normalized longitudinal force and the ideal slip ratio;
determine a longitudinal force on the first tire from the ideal slip ratio and a relationship between the longitudinal force and the ideal slip ratio under real-time road conditions; and
adjust a first torque on the first tire in order to achieve the determined longitudinal force at the first tire.

12. The vehicle of claim 11, wherein the processor is further configured to adjust the first torque on the first tire by additionally adjusting a second torque on a second tire.

13. The vehicle of claim 12, wherein the first tire is a saturated tire and the second tire is an unsaturated tire, and the processor is further configured to adjust the first torque to reduce the longitudinal force on the first tire by using a remaining capacity of the second tire.

14. The vehicle of claim 11, wherein the processor is further configured to transfer torque between a front axle and a rear axle.

15. The vehicle of claim 11, wherein the processor is further configured to adjust an upper bound of torque applied to the first tire based on a saturation level of the first tire.

* * * * *